United States Patent Office 3,751,473
Patented Aug. 7, 1973

3,751,473
PROCESS FOR FLUORINATING NITROAROMATIC MONOAMINES
Marion E. Hill and Donald L. Ross, Palo Alto, and Clifford L. Coon, Fremont, Calif., assignors to Stanford Research Institute, Menlo Park, Calif.
No Drawing. Filed July 29, 1968, Ser. No. 748,569
Int. Cl. C07c 85/00, 87/22
U.S. Cl. 260—577
5 Claims

ABSTRACT OF THE DISCLOSURE

The invention comprises the fluorination of amine-substituted nitro compounds (to produce the corresponding fluoramine-substituted nitro compounds), which fluorination is effected by dissolving the amine-substituted nitro compound in liquid hydrogen fluoride or acetonitrile, and passing fluorine, either as such or mixed with an inert gas, such as nitrogen or helium, to effect substitution of fluorine atoms for the amine hydrogen atoms.

---

This invention was supported by the Department of the Navy, Naval Ordance Systems Command, under contract No. NOw 64–0207–d.

FIELD OF INVENTION

The present invention relates to a novel process of producing readily certain novel and useful compounds which can be more specifically identified as amine-substituted nitro-compounds in which the hydrogen atoms on the amine radical have been replaced by or with fluorine atoms.

The present invention further relates to a novel process for the liquid phase fluorination of nitro-substituted amine compounds, and more particularly to the provision of a homogeneous system for the fluorination of nitro-substituted amine compounds. In one of its more specific embodiments, the invention involves the treatment of nitroaromatic amines, specifically nitro-aromatic monoamines, such as picramide, and its homologues, analogues, and substitution products to convert them in high yields to the corresponding difluoramines.

OBJECTS OF INVENTION

It is an object of the present invention to provide a new and novel process for the ready preparation in a high yield of difluoramines from the corresponding nitro-aromatic amines.

It is a further object of this invention to provide a novel class of diffuoroamino nitro compounds that have active oxygen in their structure (as nitro groups) for the energetic oxidation of the carbon in a propellant composition, and that still retain the fluorine oxidative power of $NF_2$ groups. Still another object is to provide compounds which have a favorable energy balance, possess good stability, particularly since the entire molecule is in an oxidized state, and the amenable to desensitization by means and methods used for nitro compounds.

DESCRIPTION OF PROCESS

It has now been discovered that the above and other objects may be attained effectively, cheaply and successfully by fluorinating the nitro-substituted amine compounds with fluorine while maintaining the starting material (i.e. the nitro-substituted amine compound) dissolved in anhydrous hydrogen fluoride maintained in the liquid state. Stated more precisely, the process of the present invention comprises dissolving the starting nitro-substituted amine compound in liquid anhydrous hydrogen fluoride, and passing through said solution (e.g. by bubbling) fluorine gas which may be in a pure state or diluted with a suitable inert gas, such as nitrogen. This treatment should be continued until a satisfactory or desirable amount of the starting material is fluorinated; the temperature to be used will likewise vary within wide limits depending on the reactivity of the substrate.

The reaction described above results in the conversion of the amine radical or group of the starting material to a difluoramino radical or group, thus producing the novel class or classes of fluorinated compounds identified above, which compounds will be described more fully herein below.

It was pointed out above that high yields of the desired fluorinated compounds can be obtained when one fluorinates the nitroamine compounds while they are dissolved in anhydrous liquid hydrogen fluoride. However, the compounds can be fluorinated successfully while using other solvents, e.g. acetonitrile and acetic acid. Nevertheless, in general, in order to obtain good yields of the desired nitro-substituted compounds, it is usually best to employ hydrogen fluoride.

It was pointed out that one could vary the operating temperature within wide limits. In general, it should be such that the solvent and the starting nitro-amine should be in the liquid state. Likewise, the pressure may also vary within wide limits.

The process of the present invention is applicable to the fluorination of a very broad class of nitro-substituted amine compounds. The following is a non-limiting, illustrative list of compounds which may be treated according to the present process to produce nitro-substituted difluoroamino compounds:

Methyl N-(2,2,2-trinitro methyl)carbamate,
Ethyl N-(2,2,2-trinitroethyl)carbamate,
Bis(trinitroethyl)amine,
Nitroguanidine,
2,2′,4,4′,6,6′-hexanitrodiphenyl-amine, and their homologues, analogues, and substitution products.

A particularly satisfactory starting material for fluorination in accordance with the process of the present invention is one selected from the class of nitroaromatic amines, and particularly the nitroaromatic mono-amines. The following are illustrative examples of these amines which, according to the process of the present invention, will and do produce the corresponding novel and hitherto unreported and presumably unknown nitroaromatic difluoramines:

2,4-dinitroaniline,
2,6-dinitroaniline,
2,4-dinitro-5-fluoroaniline,
picramide,
3-methoxy-2,4,6-trinitroaniline,
2,4,6-trinitro-m toluidine,
2,3,4,6-tetranitro aniline,
pentanitro aniline,
1,5-diamino-2,4-dinitrobenzene, and their homologues, analogues, and substitution products.

In general, this latter class of nitroaromatic amines may be defined by the following general structural formula:

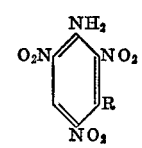

wherein R is equal to —H, —CH₃, —OCH₃, NO₂

Likewise, the fluorination products of the specific nitroamines mentioned in the penultimate paragraph would be:

1-difluoramino-2,4-dinitrobenzene,
1-difluoramino-2,6-dinitrobenzene,
1-difluoramino-2,4-dinitro-5-fluorobenzene,
1-difluoramino-2,4,6-trinitrobenzene,
3-difluoramino-2,4,6-trinitroanisole,
3-difluoramino-2,4,6-trinitrotoluene,
1-difluoramino-2,3,4,6-tetranitrobenzene,
Difluoraminopentanitrobenzene, and their homologues, analogues, and substitution products.

PREFERRED EMBODIMENTS

A more comprehensive understanding of the invention may be obtained by reference to the following examples which illustrate specific embodiments of the manufacture of fluoramine-substituted nitro compounds.

Example I.—Preparation of 1-difluoramino-2,4,6-trinitrobenzene 2.0 g. of 2,4,6-trinitroaniline was dissolved in 50 ml. of anhydrous HF in a Kel-F reactor and fluorinated by bubbling a stream of 60% $F_2$ in $N_2$ (62 cc./min.) through the solution for 3 hr. at —5–0°. As the fluorination proceeded a yellow solid precipitated from the reaction mixture. The solvent was removed by entrainment in $N_2$, leaving a yellow crystalline solid. This was immediately taken up in $CH_2Cl_2$ and treated with NaF; the solvent was removed, leaving 2.04 g. of crude 1-difluoramino-2,4,6-trinitrobenzene (crude yield, 88%). This was further purified by known means (e.g. silica gel column using chloroform as eluent) to give a yield of 75% of the final product.

Analysis.—Calcd. for $C_6H_2N_4O_6F_2$ (percent): C, 27.27; H, 0.77; N, 21.21. Found (percent): C, 27.22; H, 0.89; N, 20.91.

Example II.—Preparation of 1-difluoramino-2,6-dinitrobenzene 0.6-g. of 2,6-dinitroaniline was dissolved in 15 ml. of acetonitrile and was fluorinated at —10 to —5° with a stream of 15% fluorine in nitrogen for 55 min. or until the color of the solution changed from orange to yellow. The reaction solution was then poured into 15 ml. of diethyl ether and treated with activated charcoal, and the solvent was evaporated, leaving 0.81 g. of an orange semisolid. This was taken up in 2 ml. of chloroform and passed through a silica gel column using chloroform as solvent. The solvent was then removed in vacuo, leaving 0.39 g. of a yellow crystalline solid, M.P. 76–80°. Recrystallization from a 50% chloroform-hexane mixture yielded light yellow needles, M.P. 91–93°. This compound was identified as 1-difluoramino-2,6-dinitrobenzene by NMR, infrared, and elemental analyses.

Analysis.—Calcd. for $C_6H_3F_2O_4$ (percent): C, 32.86; H, 1.38; N, 19.18. Found (percent): C, 32.61; H, 1.53; N, 19.19.

Example III.—Preparation of 1-difluoramino-5-fluoro-2,4-dinitrobenzene

The preparative procedure was the same as in Example II. The resulting product was a light yellow crystalline solid, M.P. 51° C.

Analysis.—Calcd. for $C_6H_2F_3N_3O_4$ (percent): C, 30.37; H, 0.85; N, 17.73. Found (percent): C, 30.09; H, 0.95; N, 17.80.

Example IV.—Preparation of 3-difluoramino-2,4,6-trinitrotoluene

A 0.50-g. sample of 3-methyl-2,4,6-trinitroaniline dissolved in ~45 ml. of anhydrous hydrogen fluoride was fluorinated with a stream of 46% fluorine in nitrogen (56 cc./min.) for 30 min. at —4 to —6°; a yellow solid precipitated during the fluorination. The solvent was removed, leaving a yellow crystalline solid. This was dissolved in chloroform, filtered, and treated with sodium fluoride; the solvent was removed in vacuo, leaving 0.51 g. of a yellow crystalline solid, M.P. 105–107°. Recrystallization from a chloroform-hexane mixture yielded 0.45 g. (78% of theory) of a light yellow crystalline solid, M.P. 111°, which was identified as 3-difluoramino-2,4,6-trinitrotoluene by elemental analyses and infrared and NMR spectra.

Analysis.—Calcd. for $C_7H_4F_2N_4O_6$ (percent): C, 30.22; H, 1.45; N, 20.15. Found (percent): C, 30.22; H, 1.35; N, 20.11.

Example V.—Fluorination of 1,5-diamino-2,4-dinitrobenzene

A 1.50-g. sample of 1,5-diamino-2,4-dinitrobenzene was suspended in a 50 ml. of acetonitrile and fluorinated at 0° (with a stream of 20% fluorine in nitrogen) for 105 min. until all of the solid starting material had dissolved and the solution turned light yellow. The reaction mixture was then poured into 100 ml. of diethyl ether and treated with sodium fluoride, and the solvent was removed in vacuo, leaving 2.70 g. of an orange liquid. This was dissolved in 1 ml. of benzene and passed through a silica gel column using benzene as solvent. The solvent was removed, leaving 0.53 g. of a light yellow semisolid. Recrystallization from a solution of 40% ether in hexane yielded 0.42 g. of a yellow crystalline solid, M.P. 85° to 93°. An analysis of the solid showed that it consists of 1,5-bis(difluoramino)-2,4-dinitrobenzene and 1,5-bis(difluoramino)-2,4-dinitro-6-fluorobenzene.

Example VI.—Preparation of 2,2′,4,4′,6,6′-hexanitrodiphenylfluoramine

The reaction procedure was the same as that used in Example II. The product was obtained in a 54% yield as an orange crystalline solid, melting at 102–105° C.

Analysis.—Calcd. for $C_{12}H_4FN_7O_{12}$ (percent): C, 30.26; H, 0.85. Found (percent): C, 30.69; H, 0.98.

Example VII.—Fluorination of bis(2,2,2-trinitroethyl) amine in anhydrous HF

A 1.0 g. sample of bis(2,2,2-trinitroethyl)amine (0.0029 mole) was placed in a Kel-F fluorination apparatus and the system was purged with nitrogen. About 5 ml. of anhydrous HF was condensed into the reactor at —20° and readily dissolved the starting material. A 10% mixture of fluorine in nitrogen was bubbled into this stirred solution at —20° for 45 min. during which time a solid material separated from the reaction mixture. After removal of the cooling bath, the HF was evaporated by entrainment in nitrogen leaving 0.88 g. (84% of theory) of crude bis(2,2,2-trinitroethyl)-N-fluoramine (.0024 mole) M.P. 62–65°. The compound was recrystallized from chloroform yielding colorless needle crystals melting at 71°.

The infrared and NMR spectra were consistent with the above structure.

| Peak | Assignment | J (cps.) |
| --- | --- | --- |
| 23.6 φ quintet | —NF— | 33.6 |
| 5.05 τ doublet | —$CH_2$— | 33.8 |

Example VIII.—Preparation of 1-difluoramino-3,3,3-trinitropropane

A 5.0 g. sample of ethyl N-(3,3,3-trinitropropyl)carbamate dissolved in 60 ml. of 60% acetic acid solution was fluorinated at 5–10° for 5 hrs. with a 4:1 nitrogen:fluorine mixture. At the end of the reaction period, the reaction mixture was cooled to 0°, and approximately 30 ml. of concentrated ammonium hydroxide was added dropwise or until the solution became pH 6. The pale yellow oily phase which formed upon neutralization was extracted with three 50 ml. volumes of methylene chloride which were combined and washed with two 50 ml. volumes of 5% sodium bicarbonate solution and finally with water. The organic phase was dried over magnesium sulfate and then evaporated in vacuo to a pale yellow oil which consisted of a mixture of four components as indicated by gas chromatography. The highest boiling component which was present in largest amount was distilled at 40–45° (0.25 mm.) to yield 2.6 g. of 1-difluoramino-3,3,3-trinitropropane.

As previously mentioned, the fluoramine substituted nitro compounds have active oxygen in their structure for the energetic oxidation of the carbon in a propellant composition. As an ingredient in a composition with nitrocellulose and nitroglycerin they produce a propellant having a specific impulse of greater than 230 sec. The specific class of nitroaromatic difluoramines are in themselves explosive materials, it being possible to explode them by impact with a 2 kg. weight, their energy being comparable to that of RDX (e.g., the energy of fluorinated picramide is 90% of the energy of HMX).

We claim:

1. In a process for the fluorination of amine-substituted nitro aromatic compounds to produce the corresponding fluoramine-substituted nitro aromatic compounds, the steps of dissolving an amine-substituted nitro aromatic compound in a solvent selected from the group consisting of liquid hydrogen fluoride and acetonitrile, passing a stream of fluorine through said solution, and recovering from the resulting reaction mixture a fluoramine-substituted nitro aromatic compound corresponding to the starting nitro aromatic compound but having fluorine atoms substituted for the hydrogens on the amine radical.

2. A process according to claim 1 wherein the solvent employed was liquid hydrogen fluoride.

3. A process according to claim 1 wherein the amine-substituted nitro aromatic compound is a nitro aromatic monoamine having the general structural formula

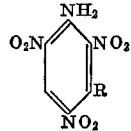

wherein R is —H, —CH$_3$, —OCH$_3$, or NO$_2$, and wherein the solvent employed was liquid hydrogen fluoride.

4. In a process according to claim 1 wherein a nitroaromatic monoamine having the general structural formula

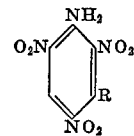

wherein R is a radical selected from the group consisting of —H, —CH$_3$, —OCH$_3$, and NO$_2$, is dissolved in liquid hydrogen fluoride, and fluorine gas is bubbled through the thus obtained solution, and wherein the reaction mixture is treated to recover therefrom an aromatic compound identical with the starting nitroaromatic amine, but having fluorine atoms substituted for the hydrogens of the amine radical.

5. In a process according to claim 4, wherein the starting nitroaromatic monoamine is 2,4,6-trinitroaniline.

References Cited
UNITED STATES PATENTS

| | | | |
|---|---|---|---|
| 3,294,495 | 12/1966 | Lawton et al. | 23—356 |
| 3,491,141 | 1/1970 | Grakauskas | 260—482 X |

LELAND A. SEBASTIAN, Primary Examiner

U.S. Cl. X.R.

149—97, 105; 260—482 C, 564 D, 576, 583 NH, 578